United States Patent [19]
Pallmann

[11] Patent Number: 5,217,424
[45] Date of Patent: Jun. 8, 1993

[54] METHOD AND APPARATUS FOR AUTOMATICALLY EXCHANGING KNIVES OF WOOD FLAKING MACHINES

[75] Inventor: Wilhelm Pallmann, Zweibrücken, Fed. Rep. of Germany

[73] Assignee: Pallmann Maschinenfabrik GmbH & Co. KG, Zweibrücken, Fed. Rep. of Germany

[21] Appl. No.: 877,437

[22] Filed: Apr. 30, 1992

[30] Foreign Application Priority Data

May 7, 1991 [DE] Fed. Rep. of Germany ....... 4114840

[51] Int. Cl.⁵ .............................................. B23Q 3/155
[52] U.S. Cl. .......................................... 483/1; 483/31; 483/57
[58] Field of Search ........................ 483/31, 30, 13, 20, 483/1, 16, 19, 27, 54, 57, 60; 241/292.1, 286, 291

[56] References Cited

U.S. PATENT DOCUMENTS 3,941,319  3/1976  Pallmann ............................. 241/290
4,660,777  4/1987  Schaefer et al. ................. 241/241 X
4,712,289  12/1987  Stamm et al. ..................... 483/60 X

FOREIGN PATENT DOCUMENTS

3309517  3/1984  Fed. Rep. of Germany.
166936   7/1987  Japan ..................................... 483/57
1143571  3/1985  U.S.S.R. ............................... 483/20
2013136  8/1979  United Kingdom.

Primary Examiner—William Briggs
Attorney, Agent, or Firm—Robert W. Becker & Associates

[57] ABSTRACT

A method for automatically exchanging flaking knives in a knife ring of wood flaking machines in which the knives are attached to respective knife holders in a force-looking connection comprises the following steps: Loosening the force-locking connection between the flaking knife and the respective knife holder; automatically removing the flaking knife from its holder; automatically exchanging the removed flaking knife for a sharpened flaking knife; automatically inserting the sharpened flaking knife into the knife holder; and, depending on the wear of the wall portion, automatically positioning the sharpened flaking knife in the knife holder such that a cutting edge of the flaking knife protrudes relative to the adjacent inner wall surface of the knife ring to an extent that corresponds to the desired cutting depth. The exchange device for carrying out this method is comprised of a knife ring with knife holders and flaking knifes fastened to the knife holders; a device for receiving the knife ring; a support connected to the receiving device and insertable into the interior of the knife ring when the knife ring is received in the receiving device; a transport mechanism and an adjusting device connected to the support; an ejecting device connected to the receiving device and positioned at an outer circumference of the cutting block; and an exchange magazine slidably mounted on the receiving device and slidable in a direction transverse to the axial direction of the knife ring.

11 Claims, 6 Drawing Sheets

METHOD AND APPARATUS FOR AUTOMATICALLY EXCHANGING KNIVES OF WOOD FLAKING MACHINES

BACKGROUND OF THE INVENTION

When manufacturing wood chips or flakes for further industrial applications, the wear on the edges of the cutting, respectively, flaking knives is so great that their service life commonly only encompasses a few hours. This results in approximately one thousand knife exchanges within one year. Since with increasing dullness of the cutting edges the quality of the manufactured wood chips, respectively, flakes is quickly reduced and, simultaneously, the amount of drive energy for the flaking machine increases substantially, it is unavoidable to exchange the dull knives within relatively short periods of time with sharpened knives.

This knife exchange for rotatably supported knife ring within the flaking machine is in general possible by providing a respective opening within the machine housing; however, in order to reduce the downtime it is common to first remove the knife ring as a whole and replace it with a second knife ring with sharpened knives. The actual knife exchange is then performed at the removed knife ring.

After reinserting the sharpened knives in the knife ring, the cutting edges of the knives must be positioned such that they protrude relative to the cylindrical inner wall surface of the knife ring formed by so-called wearing plates to an extent that corresponds to the desired thickness of the flakes or cuttings produced. For this purpose, a knife holder is required which allows the adjustment of the knife edges with a special adjustment means outside of the cutting machine. Accordingly, each individual knife of the prior art is connected in a releasable manner to a knife support plate which is provided with a reference surface indicating the respective position of the knife edge for the required protrusion corresponding to the cutting or flaking depth, whereby this reference surface comes into contact with a corresponding reference surface provided at the knife holder of the knife ring when the knife unit comprised of the knife and its knife support plate is fastened to the knife holder. In this manner, a reproducible cutting edge positioning with respect to the initial state of the cylindrical inner wall surface of the knife ring is ensured; however, the wear of the inner wall surfaces at certain locations is not taken into consideration. Over an extended period of time, especially when the wear of the inner wall surfaces is great, a constant increase of the thickness of the flakes, respectively, cuttings will result which is finally no longer acceptable with respect to given quality standards.

During the frequent knife exchanges the handling of the relatively heavy knife rings is cumbersome, and bears the danger of causing injuries. Furthermore, it is time consuming, especially because the knives, before the sharpening step, must be released from the knife support plates and afterwards must again be connected thereto whereby their edges must be adjusted to the theoretical protrusion value relative to the provided reference surfaces at the knife support plates.

There have been numerous suggestions to find ways to avoid the cumbersome handling of the knife ring, however, the solutions that have been known so far concern only those exchange methods in which the knife ring remains positioned in the flaking machine. Accordingly, these methods are only suitable for knife rings that are rotatably supported and are not applicable to stationary knife rings.

Such a method for exchanging the flaking knives in the knife ring which is mounted in the flaking machine is described in the British patent application GB 2 013 135 A. The knives may be exchanged after being released from their respective knife holder, however, a complicated adjusting device is required which allows the adjustment of the projection of the cutting edges of the flaking knives relative to the adjacent wall portions corresponding to the desired flake thickness directly on the knife ring. This adjusting device requires at least three cylinder/piston units. After shutting down the flaking machine, a first unit must be attached to the arrested rotor and the two other units must be fastened to the exterior of the machine housing in the area of a closeable opening. In addition to the constructive expenditure, the mounting and demounting of the adjusting device requires a considerable preparation time which in addition to the time-consuming actual knife exchange results in an economically unfeasible downtime. This exchange method therefore has not been successful in practice.

A different approach has been suggested with the German Patent DE 33 09 517 C1 which discloses a method for providing a continuous sharpness of the knives in which the downtime resulting from the knife exchange is prevented by providing strip steel knives which during the operation of the flaking machine are continuously or stepwise fed into the working zone of the machine depending on the respective wear condition. This method is limited to resharpening so-called disposable knives made of strip steel, and the exchange of high-quality knives that need to be repeatedly sharpened, the subject matter of the present invention, is expressly avoided.

It is therefore an object of the present invention to eliminate the cumbersome and time-consuming handling of the heavy knife rings during removal and remounting, as well as during adjustment of the cutting edges without causing a reduction in quality of the manufactured wood flakes. Also, while employing the known knife holders, an automatic knife exchange should be possible with the aid of spring forces. Furthermore, according to the present invention, the suggested method should also be compatible with conventional knife rings, if necessary, after minimal retro-fitting.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The inventive method is in general performable with knife rings having flaking knives with cutting edges pointing inwardly and being connected and force-locked to the knife-support plate by clamping strips, as is known from U.S. Pat. No. 3,941,319. According to the present invention, this force-locking connection must only be loosened to a certain degree in order to be able to automatically push a dull knife out of its knife holder. The loosening of the force-locking connection, depending on the way this force-locking connection is achieved, may be performed manually or automatically. Since also the subsequent method steps, i.e., the exchange of the dull knives for sharpened knives as well as their introduction into the knife holders may be performed automatically, all of the required cumbersome and time-consuming manipulations of the knife ring are obsolete with the inventive method. Furthermore, the present invention has the advantage that, due to the automatic adjustment of the cutting edges in the respectively last method step of the inventive knife exchange, the desired cutting depth, respectively, the required cutting edge protrusion into the interior of the knife ring is adjusted with respect to the wear of the inner wall surfaces of the knife ring. Accordingly, it is ensured that even under a fast wear progress a uniform flake or cutting quality is accomplished due to the readjustable protrusion value resulting in a constant flake thickness.

The method of the present invention comprises the following steps:

a) demounting the knife ring;

b) placing the knife ring onto a transport carriage;

c) coupling the knife ring to an exchange device;

d) rotating the knife ring into an exchange position;

e) locking the knife ring in that exchange position;

f) loosening the force-locking connection between one of the flaking knives and a knife support plate of the respective knife holder;

g) moving the one flaking knife into an interior of the knife ring;

h) removing the one flaking knife from the interior in an axial direction of the knife ring;

i) putting down the one flaking knife outside the knife ring and gripping a prepared sharpened flaking knife;

j) moving the sharpened flaking knife into the interior of said knife ring in the axial direction;

k) inserting the sharpened flaking knife into the respective knife holder which is empty;

l) adjusting the cutting edge of the sharpened flaking knife relative to the adjacent inner wall surface of the interior of the knife ring;

m) accomplishing the force-locking connection between the sharpened flaking knife and the knife support plate;

n) releasing the knife ring from that exchange position;

o) rotating the knife ring into a further exchange position for exchanging a further one of the flaking knives;

p) repeating the steps e) to o) according to the number of the flaking knives of the knife ring; and q) uncoupling the knife ring from the exchange device.

The exchange device for carrying out the inventive method is comprised of a knife ring with knife holders and flaking knives fastened to the knife holders; a means for receiving the knife ring; a support with a base body, the support being connected to the receiving means and insertable into an interior of the knife ring when the knife ring is received in the receiving means; a transport mechanism connected to the support; an adjusting device connected to the support; an ejecting device connected to the receiving means and positioned at an outer circumference of the knife ring when the knife ring is received in the receiving means; and a slidable exchange magazine slidably mounted on the receiving means and slidable in a direction transverse to an axial direction of the knife ring when the knife ring is received in the receiving means.

It is preferable that the transport mechanism is comprised of a glide plate having a lower edge and connected to the base body of the support, the glide plate having a first inclination relative to the vertical and the flaking knives and the knife ring having a second inclination relative to an outer circumference of the knife ring, with the first and second inclination being identical, the glide plate further having a locking strip at the lower edge; a transport frame of a rectangular shape and a size corresponding to the size of the flaking knives, the transport frame being open in a downward direction and slidable over the glide plate in the axial direction of the cutting block.

In a preferred embodiment of the present invention, the transport mechanism further comprises a gliding traverse, connected to the transport frame, and a sliding piece, the sliding piece being slidably connected to the gliding traverse, and a drive unit connected to the sliding piece for sliding the sliding piece back and forth on the gliding traverse, and wherein the glide plate further comprises the bottom portion and a looking plate with a bent portion, the locking plate being connected to the bottom portion and the bent portion forming the locking strip.

It is expedient that the support has a compressed air jet connected to the sliding piece.

The adjusting device of the present invention is preferably comprised of an adjusting cylinder having a piston rod arranged therein, the adjusting cylinder being connected to the base body, the adjusting device acting radially on the knife ring, and further comprising a transverse stay, connected to a free end of the piston rod, and a first and a second adjusting bracket connected to free ends of the transverse stay, each bracket having two sensor surfaces spaced from one another in the circumferential direction of the knife ring and further having an adjusting surface located between the two sensor surfaces.

It is further expedient that the knife holder comprises a knife support plate and a pressure screw, whereby the flaking knives are positioned on the knife support plate and are fastened by the pressure screws on the knife holder in a force-locking manner.

The ejecting device of the present invention is comprised of an ejecting cylinder having a piston rod arranged therein and an ejecting fork with two prongs connected to the free end of the piston rod, and wherein the knife holders each have two parallel grooves for guiding the prongs, each knife holder further comprising a clamping strip and two leaf springs arranged between the clamping strip and the knife support plate, the clamping strip and the knife support plate being connected to one another by the pressure screw.

Preferably, the exchange magazine is divided into compartments that are open on two sides in a direction transverse to a longitudinal direction of the exchange magazine, the compartments having a first inclination relative to the vertical and the flaking knifes of the knife ring having a second inclination relative to an outer circumference of the knife ring, with the first and second inclination being identical, and with a number of the compartments being greater by one than a number of the flaking knives.

It is expedient that the exchange magazine further comprises a magazine slide, rails and a stepped switching device, the exchange magazine being fixedly connected to the magazine slide and the magazine slide being slidably connected to the rails the stepped switching device being connected to the magazine slide.

The receiving means of the exchange device comprises a frame, and the exchange device further comprises a lifting cylinder with a limited stroke connected to the frame, whereby the lifting cylinder has a piston rod with a pushing end arranged therein. The exchange device further comprises a spring connected between the frame and the lifting cylinder.

DESCRIPTION OF PREFERRED EMBODIMENTS

The present invention will now be described in detail with the aid of several specific embodiments utilizing FIGS. 1 through 9.

Figure 1:
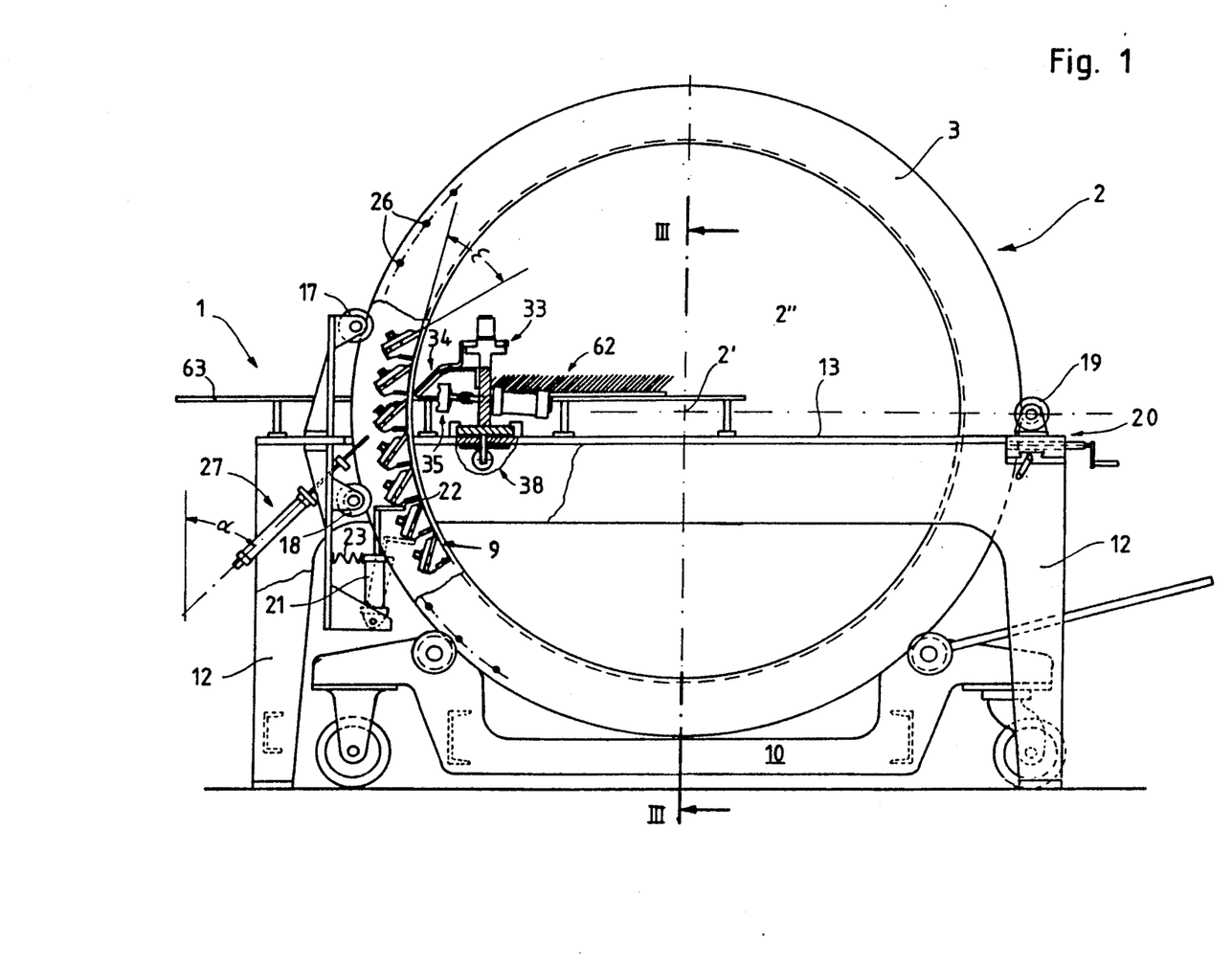
FIG. 1 shows an exchange device according to the present invention in a side view, partially in a sectioned view.

FIG. 1 shows an exchange device 1 with a knife ring 2 coupled thereto. The ideal center axis of the knife ring 2 is designated by reference numeral 2' and the interior of the knife ring is designated by reference numeral 2". The knife ring 2 is comprised of two annular disks 3 which are spaced from one another in the axial direction and are connected to one another by knife support plates 4 which are evenly distributed over the circumference of the annular disks 3. The flaking knives 5, with their cutting edges 6 pointing towards the center axis, are held in a force-locking manner on the knife support plate 4 by clamping strips 7 and pressure screws 8. The knife support plate 4 the clamping strip 7, and the pressure screw 8 form the force-locking knife holder 9.

The knife ring 2, which has been removed from the flaking or cutting machine and transported into the so-called sharpening room is rotatably supported on an undercarriage 10 by two bearing rollers 11. For this purpose, the two bearing rollers 11 are provided with two annular grooves which are engaged by the two annular disks 3 of the knife ring 2.

The exchange device 1, which is located in the so-called sharpening room, is comprised of a frame 12 supporting a tabletop 13. As can be seen especially from FIG. 2, the tabletop 13 is provided with a rectangular rearwardly open cutout 14 which thus creates two table top legs of varying width, whereby in the following the wider leg will be called magazine bench 15 and the narrower leg will be called arresting bench 16. In the forward area of the cutout 14 two stationary positioning rollers 17 and 18 are provided and spaced at an identical distance above and below the table top 13. The positioning rollers 17 and 18 have annular grooves into which the knife ring 2 is pressed assisted by two pressure rollers 19 arranged within the horizontal center plane of the knife ring 2. Due to this three-point contact a defined and reproducible positioning of the knife ring 2 relative to the exchange device 1 is ensured while at the same time an axial fixation is also accomplished. The two pressure rollers 19 are located on cross-type carriages 20 at the rearward ends of the magazine bench 15, arresting bench 16 so that they are movable in two horizontal directions which are perpendicular to one another.

A pivotably arranged lifting cylinder 21 with a limited piston stroke is provided for performing the rotation of the knife ring 2 in correspondence to the respective positions of the individual knives. The piston rod of the lifting cylinder 21 is provided with a pushing end 22 engaging a portion of the knife ring 2 below a respective knife holder 9. In order to allow the pushing end 22 to catch again behind the next knife holder 9 during its reciprocating stroke, the lifting cylinder 21 is provided with a pressure spring 23 having a return force which, during the reciprocating stroke of the pushing end 22 which is gliding over the respective clamping strip 7, causes the pushing end 22 to catch below the next knife holder. In this manner, with each lifting stroke the knife ring 2 is rotated by exactly the distance between two knives in a clockwise direction. After each such rotational movement, the knife ring 2 is arrested by an arresting cylinder 24 connected to the arresting bench 16. The piston rod of the arresting cylinder 24 is in the form of a locking bolt 25 engaging a respective locking bore 26 provided at one of the two annular disks 3 and coordinated with an individual knife holder.

Figure 8:
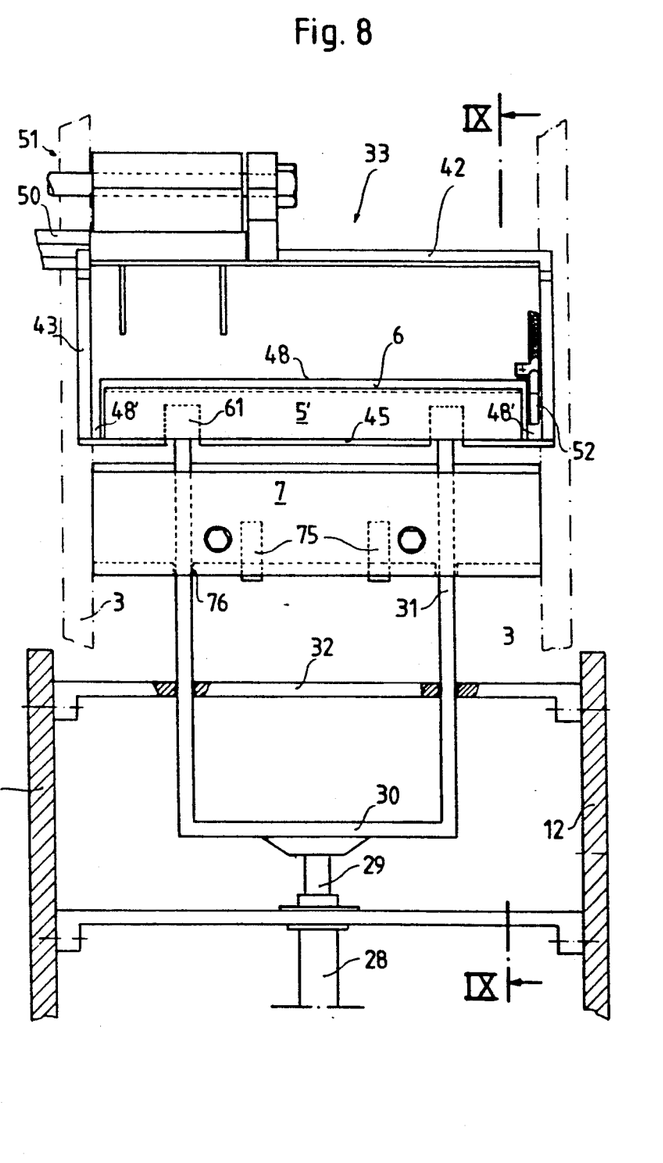
FIG. 8 is a cross-sectional view along the line VIII—VIII in FIG. 5.
Figure 9:
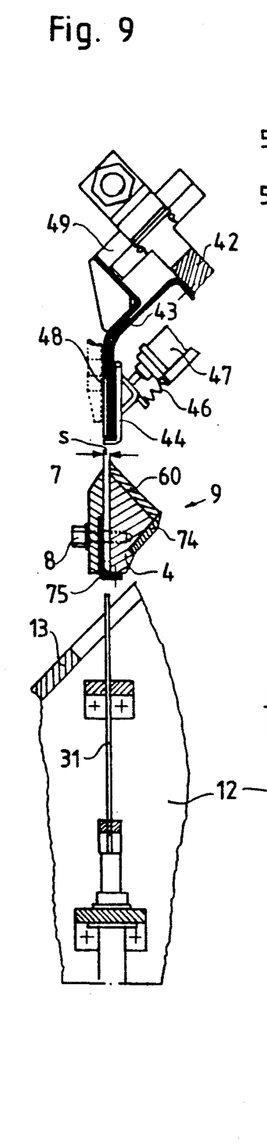
FIG. 9 is a cross-sectional view along the line IX—IX in FIG. 8.

Below the table top 13, within the forward area of the frame 12, an ejecting device 27 for the knives 5 is provided. This ejecting device 27 is comprised of an ejecting cylinder 28 having a piston rod 29 with an ejecting fork 30 connected thereto. The ejecting fork 30 is provided wit two prongs 31 spaced at a distance from one another. These prongs 31 are slidably guided within holes provided at a guiding traverse 32 connected to the frame 12. The actuation direction of the ejecting fork 30 is inclined relative to the vertical at an angle $\alpha$ which corresponds to the insertion angle $\epsilon$ of the knives 5 at the knife ring 2. FIGS. 8 and 9 show details of the ejecting device, with FIG. 8 showing the ejecting device during the removal of a knife and FIG. 9 showing the ejecting device after the completion of the knife removal.

A support 33 is insertable into the interior 2" of the knife ring 2 parallel to the center axis 2'. The support 33 supports the transport mechanism 34 as well as the adjusting device 35. The support 33 is mounted on a support slide 36 which is slidable on a guide means 37, the larger portion of which is located on the magazine bench 15 and which continues on the opposite side of the cutout 14 on the resting bench 16, here being indicated by reference numeral 37'. For inserting and removing the support 33, a pushing cylinder 38 is provided below the magazine bench 15, the pushing cylinder 38 having a piston rod 39 engaging the bottom portion of the support slide 36. For limiting the insertion movement of the support 33, an adjustable abutment 40 is provided at the arresting bench 16 whereby a clamping screw 41 is provided for arresting the support 33 in its operating position.

The support 33 is comprised of a base body 42 to which a glide plate 43 is connected at an angle of inclination $\gamma$ relative to the vertical. The angle of inclination γ corresponds also to the insertion angle ε of the knife 5 at the knife ring 2. Below the glide plate 43 a looking plate 44 is mounted in a pivotable manner which at its lower end, is provided with a locking strip 45 for engaging the glide plate 43. The locking strip serves as a rest for the knives 5 during the exchange steps. The pivoting of the locking plate 44 is achieved in cooperation with a tension spring 46 by a control cylinder 47 which is laterally connected to the support 33.

Above the glide plate 43 and spaced at a short distance therefrom, a rectangular transport frame 48 is provided which is open in a downward direction. This transport frame 48 is connected with a sliding piece 49 which can be moved back and forth. The two lateral legs 48' of the transport frame 48 function as pushing members for the knives 5 to be exchanged. The back and forth movement of the sliding piece 49 which is supported in a slidable manner on a gliding traverse 50 is effected by a reversible drive unit 51 which, in the described embodiment, is in the form of a pneumatic cylinder without a piston rod.

A compressed air jet 52 is connected to the transport frame 48 whereby the ejecting direction of the jet is aligned with the empty slot s defined between the knife support plate 4 and the clamping strip 7 when the knife 5 is removed.

Furthermore, the base body 42 of the support 33 is also provided with an adjusting device 35. This adjusting device 35 is comprised, as can be seen especially in FIGS. 5, 6, 7, of an adjusting cylinder 53 with a piston rod 54 having an axially extending transverse support 55 connected to the piston rod 54. The transverse support 55 has two ends which are each provided with an adjusting bracket 56. The adjusting bracket 56 is guided on a radially extending parallel gliding rod 57. As can be seen especially from FIG. 7, the adjusting bracket 56 is comprised of two sensor surfaces 58 spaced from one another in the peripheral direction of the knife ring 2 and have therebetween an adjusting surface 59. During the adjusting step, the two adjusting brackets 56 which are axially spaced from one another are moved in the radial direction toward the so-called wearing plates 60 that form the inner wall surfaces of the knife ring 2. For this purpose, the glide plate 43 and the locking plate 44 are provided with two respective penetrating openings 61.

An exchange magazine 62 is located on the magazine bench 15 alongside the received knife ring 2. The exchange magazine 62 is slidably connected to two parallel rails 63. During the exchange process, the removed dull knives 5' are received by the exchange magazine 62 and, simultaneously, the sharpened knives 5" contained therein are reloaded into the knife ring 2. For this purpose, the exchange magazine 62 is divide into a number of compartments 66 that is greater by one than the number of knives 5 provided at the knife ring 2. The walls 67 of the compartments 66 are inclined relative to the vertical at an angle β which corresponds also to the angle of insertion ε of the knives 5 at the knife ring 2. The compartments 66 of the exchange magazine 62 are open on both sides so that the transport frame 48 may pass through each compartment in both directions. For this purpose, the gliding traverse 50, along which the sliding piece 49 together with the transport frame 48 is movable back and forth, bridges the exchange magazine 62, as can be seen especially from FIG. 3.

The rails 63 of the exchange magazine 62 are positioned on stands 64 so that they are above the magazine bench 15 and bridge the guide means 37 for the support slide 36. Within this bridging portion, the rails are however connected via support beams 65 to the support slide 36 so that the rail portion 63' separate from the remaining rails 63 follows the insertion and removal movements of the support 33 and supplements the rails 63 to form a continuous rail system only in the inserted state of the support 33.

The exchange magazine 62 is fixedly connected to a magazine slide 60 which, on its bottom side, is provided with gliding portions which correspond to the profile of the rails 63. Furthermore, the magazine slide 68, on its bottom portion, has a stepped switching device 69 which is comprised of a toothed rod 70 cooperating with a catch 71 engaging the teeth of the rod 70. The catch 71 is elastically connected to the piston rod 72 of a stepping cylinder 73. In this manner, the exchange magazine 62 may be pushed forward in a stepped manner by exactly one compartment width so that a dull knife 5' which has just been inserted into an empty compartment 66' leaves the transport frame 48 and, simultaneously, a sharpened knife 5" is inserted into the subsequent compartment 66" to then be moved into the free interior 2" of the knife ring 2 during the reciprocating stroke of the sliding piece 49 caused by the transport frame 48 connected to the sliding piece 49. In the interior 2" of the knife ring 2, after being released by the locking strip 45 at the glide plate 43, the sharpened knife 5'", due to gravity, automatically slides into the empty knife slot s of the knife holder 9 being serviced.

FIGS. 8 and 9 show details of the force-locking knife holder 9 within the knife ring 2 illustrating the required embodiment of the knife holder for performing of the inventive method for automatically exchanging knives, respectively, for the application of the inventively embodied exchange device 1. In the cross-sectional view of FIG. 9 the knife support plate 4 is shown. It can also be seen that the inner wall of the knife ring 2 is provided with a wearing plate 60 and with a pressure lip 74 facing the knife of an adjacent knife holder. Between the clamping strip 7 and the knife support plate 4, two leaf springs 75 are inserted which, after loosening the pressure screw 8, force the clamping strip 7 away from the knife support plate 4 so that the respective knife 5 may be removed from its knife holder 9 via the ejecting device 27. For this purpose, the knife support plate 4 is provided with two parallel grooves 76 within which the prongs 31 of the ejecting fork 30 are guided. The prongs 31 push the dull knife 5' from its knife support plate 4 onto the glide plate 43 of the support 33 and into the already positioned transport frame 48 which is open at the bottom. Here, the knife 5' is engaged by the locking strip 45 of the locking plate 44.

The inventive exchange device functions as follows:

The knife ring 2 which has been removed from the respective flaking machine is transported on the transport carriage 10 into the sharpening room where the exchange device 1 is located. The knife ring 2 is coupled to the exchange device 1 such that the knife ring 2 is inserted into the cutout 14 until it abuts with its two annular disks 3 at the two pairs of positioning rollers 17 and 18 and in this position is fixedly connected against sliding movements by the two pressure rollers 19 which are moved into position via their cross-type carriages 20. Thus, the knife ring 2 is unslidable, however, freely rotatable.

The support 33 is then pushed into the interior 2" of the knife ring 2 by the pushing cylinder 38 until it abuts at the abutment 40 provided at the arresting bench 16 and, in this operating position, is secured by the clamping screw 41. After the insertion of the support 33, the portion 63' of the rail system supplements the rails 63 of the support slide 36 so that a continuous rail system is formed. The magazine slide 68, which has the exchange magazine 62 with the sharpened knives 5" fixedly connected thereto, is then moved into the initial position shown in FIG. 4. The exchange magazine 62 has a number of compartments 66 which is greater by one than the number of knives 5 provided at the knife ring 2 so that initially the first compartment 66' is empty.

The lifting cylinder 21 of the knife ring 2 is then actuated and the knife ring 2 is rotated into its first exchanging position in which it is locked by activating the locking means comprised of the arresting cylinder 24, the locking bolt 25, and the locking bore 26. Then, the two pressure screws 8 of the respective knife holder 9 are loosened to such an extent that the two leaf springs 75 push the clamping strip 7 away from the knife support plate 4.

From this moment on, the knife exchange is entirely automatic due to a subsequent systematic control. The knife exchange begins with the actuation of the ejecting device 27 which pushes the dull knife 5' which is loosely placed on the knife support plate 4 onto the glide plate 43 of the support 33. Here, the bottom of the knife 5' is engaged by the locking strip 45 of the locking plate 44 which is maintained in its locking position by the control cylinder 47 and is furthermore laterally enclosed by the transport frame 48. At this moment, the compressed air jet 52 and the drive unit 51 of the sliding piece 49 are simultaneously activated so that the transport frame 48 connected to the sliding piece 49 pushes the dull knife 5' positioned on the glide plate 43 in an outward direction into the first empty compartment 66' of the exchange magazine 62. Now, the stepped switching device 69 of the magazine slide 68 is activated and pushes the exchange magazine 62 connected thereto in a forward direction by exactly the distance between two neighboring compartments 66. Accordingly, the first dull knife 5' is pushed out of the transport frame 48 and the sharpened knife 5" which has been stored in the next compartment 66" enters the transport frame 48. During the subsequent reciprocating stroke of the sliding piece 49, the sharpened knife 5" is then moved onto the glide plate 43 of the support 33 from the transport frame 48 in the interior 2" of the knife ring 2. As soon as it reaches the insertion position, the compressed air jet, which has been moved back and forth, is switched off and the control cylinder 47 releases the locking plate 44 so that, with the aid of the tension spring 46, the locking plate 44 pivots and the locking strip 45 is removed thereby releasing the sharpened knife 5" and, due to gravity the knife 5" glides on the glide plate 43 in a downward direction into the knife slot s which has been held open by the leaf springs 75. This gliding movement is stopped by the knife 5" abutting at the two pressure screws 8. Subsequently, the adjusting device 35 is actuated and the adjusting cylinder 53 is moved toward the inner wall surface of the knife ring 2 which is formed by the wearing plates 60. The penetrating openings 61 provided at the glide plate 43 and the locking plate 44 provide a passage for the two adjusting brackets 56 so that the adjusting brackets 56 with their two sensor surfaces 58 may contact the wearing plates 60 arranged adjacent to the sharpened knife 5". Then, the two ejecting prongs 31 move the sharpened knife 5" radially inwardly to such an extent that the free surface 77 of the knife 5" abuts the adjusting surface 59 of the two adjusting brackets 56. After reestablishing the force-locking connection between the knife 5" and the knife support plate 4 by tightening the pressure screws 8, a cutting edge projection d that takes into account the localized wear of the wearing plates 60 is automatically accomplished over the entire width of the knife.

Figure 2:
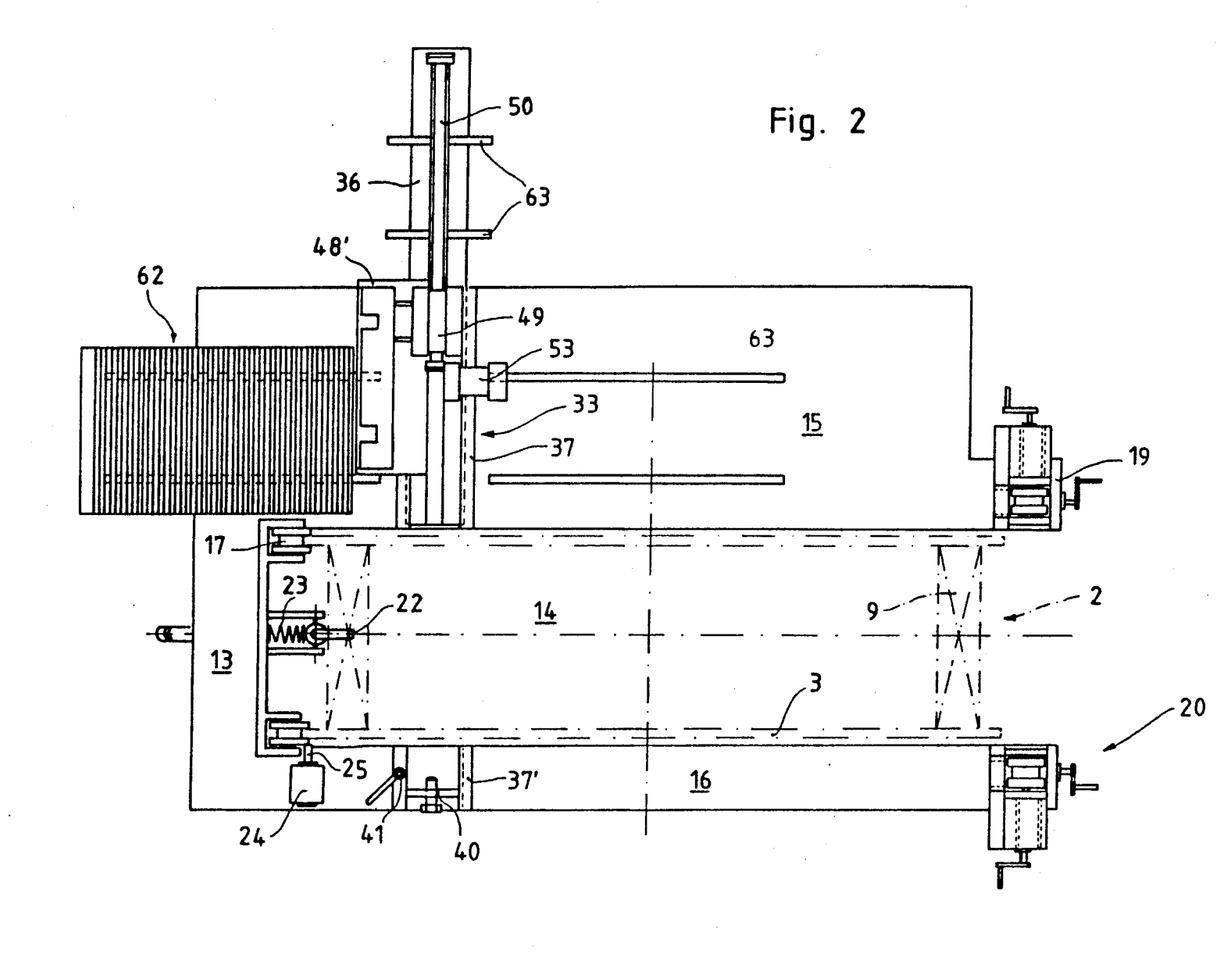
FIG. 2 shows a plan view of the inventive exchange device.
Figure 3:
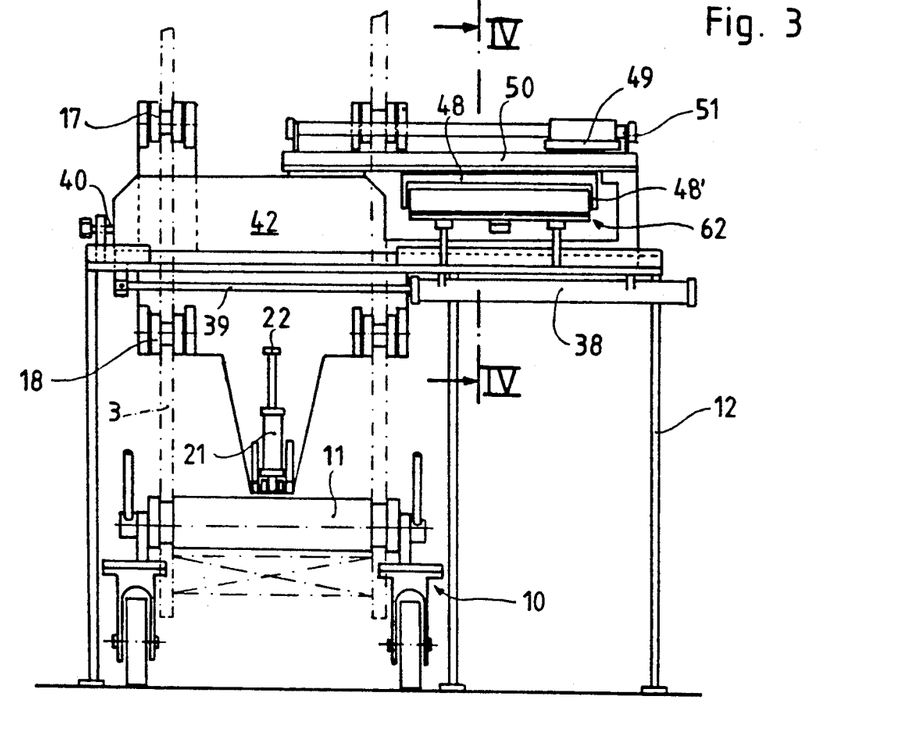
FIG. 3 a cross-sectional view along the line III—III of FIG. 1.
Figure 4:
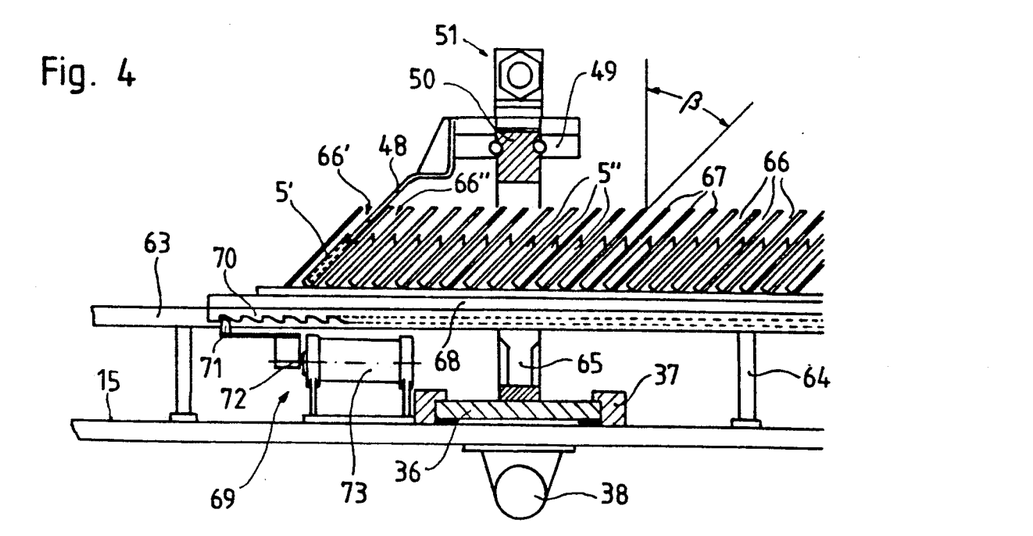
FIG. 4 is a cross-sectional view along the line IV—IV of FIG. 3 on a greater scale.
Figures 5, 6:
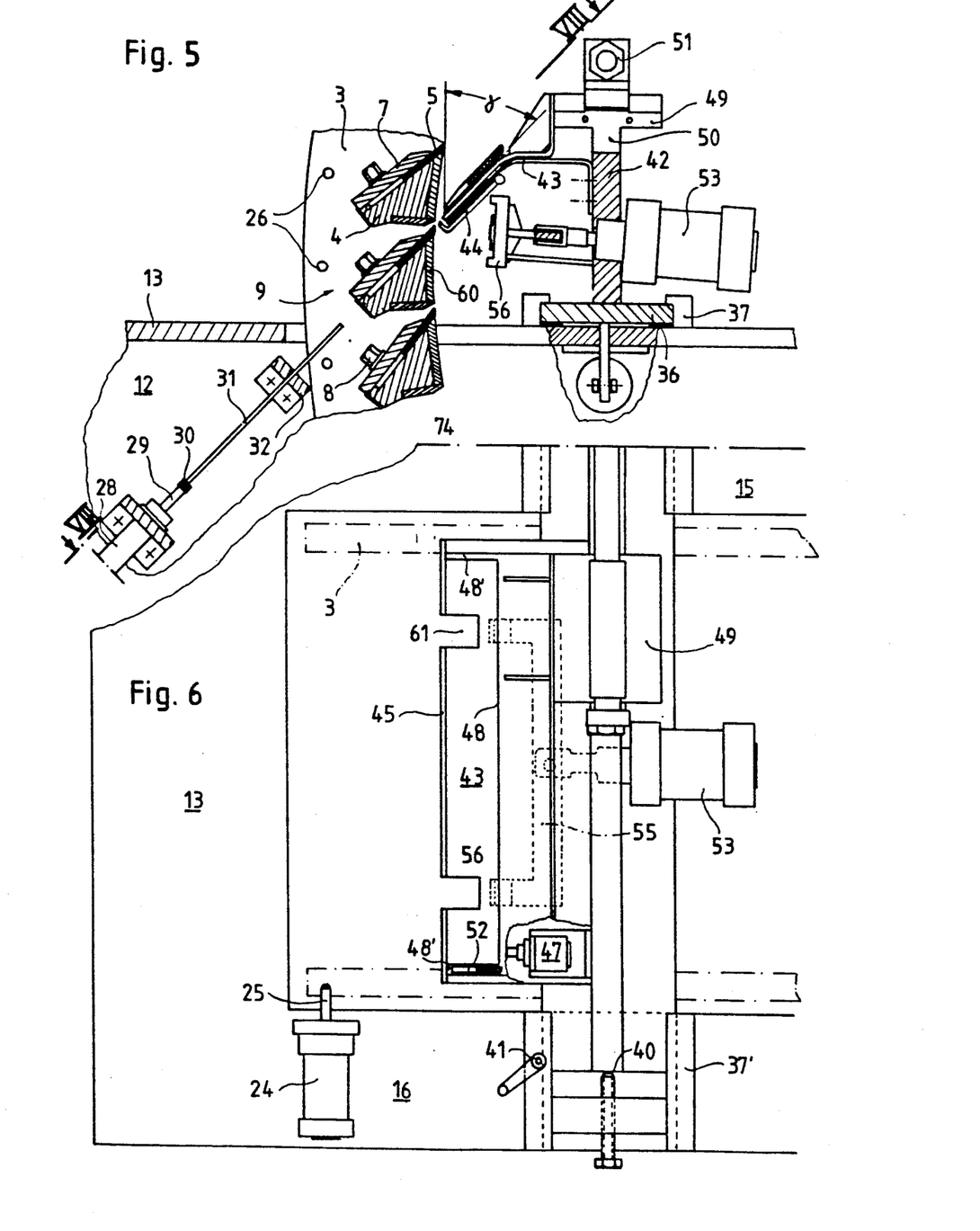
FIG. 5 shows details of FIG. 1 on a greater scale.
FIG. 6 is a plan view of FIG. 5.
Figure 7:
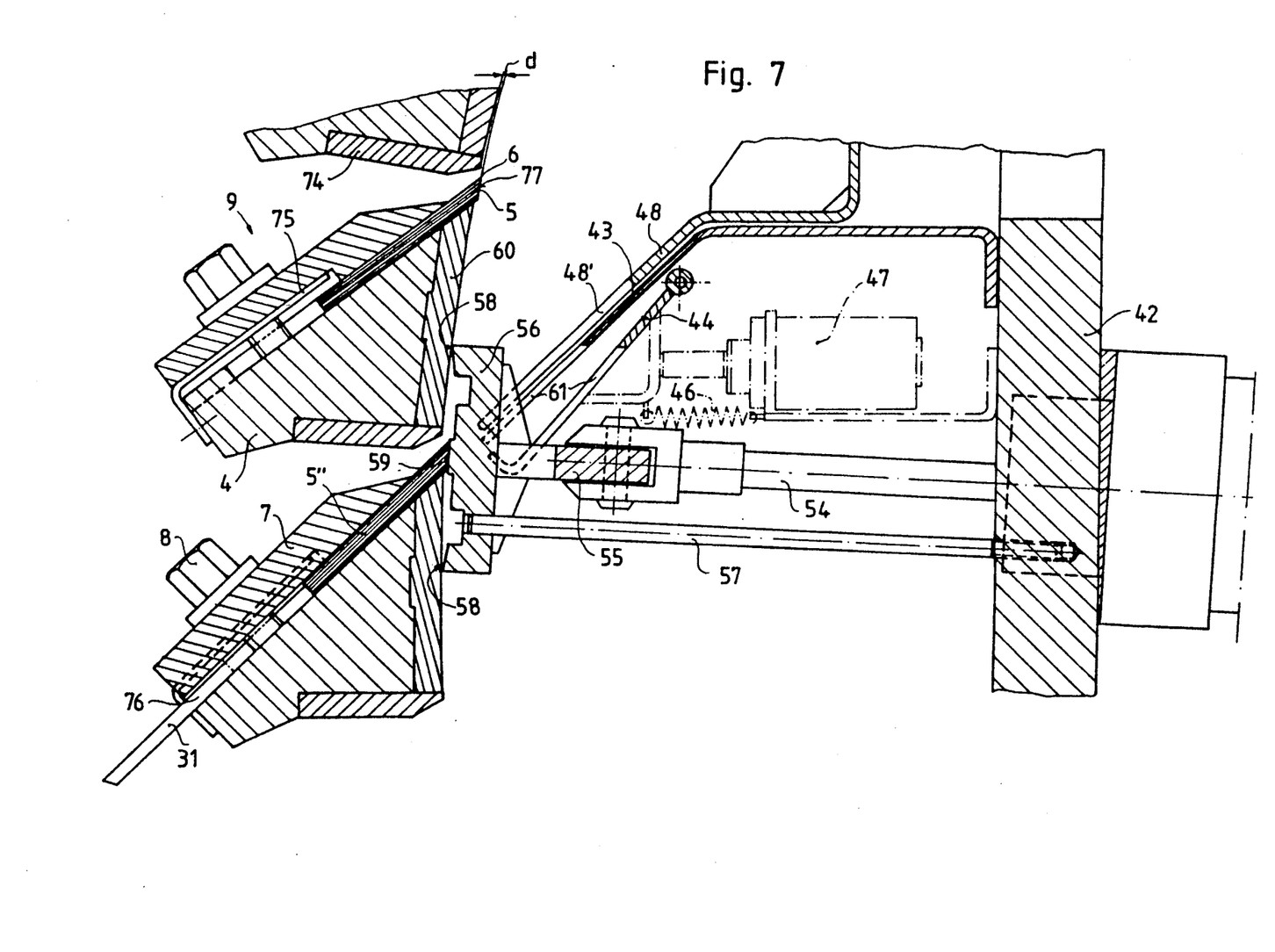
FIG. 7 is an adjustment device in its adjustment position shown on a greater scale.

After retracting the adjusting device 35 an after releasing the rotational locking means in the form of the arresting cylinder 24, the locking bolt 25 and the looking bore 26, the exchange process for the next knife 5 of the knife ring 2 may begin. After the exchange of all of the knives 5 of the knife ring 2 has been accomplished, the exchange magazine 62, now filled with dull knives 5', is in the position shown in FIG. 2. Accordingly, the support 33 together with the rail portion 63' resting on the support slide 36 may be removed. By removing the pressure rollers 19 in a cross-wise manner via their cross-type carriages 20, the knife ring 2, indicated in a dash-dotted line in FIG. 2, is uncoupled from the exchange device 1 and is ready for the subsequent knife ring exchange at the flaking machine.

The above described embodiment of the present invention is useful for stationary as well as for rotating knife rings. Knife rings that are already in use with a certain flaking machine need only a minimal retro-fitting of the knife holders by providing respective clamping strips. The expenditure for this retro-fitting measure is small relative to the multitude of advantages provided with the present invention. These advantages not only encompass the facilitated knife exchange which requires 50% less time, but also lie in the fact that the flaking knives, since they inventively are not connected with special holding plates, do not need a special embodiment for this purpose. This also reduces the initial costs for such knives and increases, on the other hand, their resharpening availability which results in a better use of the high-quality knife materials. Furthermore, a better flake or cutting quality is achieved because the adjustment of the cutting edge protrusion d, which determines the thickness of the flakes or cuttings, is inventively determined directly with respect to the wear of the adjacent inner wall surfaces of the knife ring.

With knife rings in which the force-locking connection of the knives to the knife support plates is not achieved by pressure screws 8 as described before, but by spring forces acting on the clamping strips 7 on both sides of the annular disks 3 of the knife ring, as is known from U.S. Pat. No. 3,941,319, the exchange device 1 may additionally be provided with a lifting device for loosening the force-locking connection. An exchange device which is completed in this manner thus allows an entirely automated knife exchange.

The present invention is, of course, in no way restricted to the specific disclosure of the specification and drawings, but also encompasses any modifications within the scope of the appended claims.

What I claim is:

1. A method for automatically exchanging flaking knives in a knife ring removed from a wood flaking machine in which said flaking knives, with their cutting edges radially inwardly oriented, are attached to respective knife holders by clamping strips in a force-locking connection, wherein said knife holders are evenly distributed over a circumference of said knife ring, said method comprising the steps of:

a) demounting said knife ring;
b) placing said knife ring onto a transport carriage;
c) coupling said knife ring to an exchange device;
d) rotating said knife ring into an exchange position;
e) locking said knife ring in that exchange position;
f) loosening said force-locking connection between one of said flaking knives and a knife support plate of said respective knife holder;
g) moving said one flaking knife into an interior of said knife ring;
h) removing said one flaking knife from said interior in an axial direction of said knife ring;
i) putting down said one flaking knife outside said knife ring and gripping a prepared sharpened flaking knife;
j) moving said sharpened flaking knife into said interior of said knife ring in said axial direction;
k) inserting said sharpened flaking knife into said respective knife holder which is empty;
l) adjusting the cutting edge of said sharpened flaking knife relative to the adjacent inner wall surface of said interior of said knife ring;
m) accomplishing said force-locking connection between said sharpened flaking knife and said knife support plate;
n) releasing said knife ring from that exchange position;
o) rotating said knife ring into a further exchange position for exchanging a further one of said flaking knives;
p) repeating the steps e) to o) according to the number of said flaking knives of said knife ring; and
q) uncoupling said knife ring from said exchange device.

2. An exchange device for automatically exchanging flaking knives in a knife ring removed from a wood flaking machine, said exchange device comprising:
a knife ring with knife holders and flaking knives fastened to said knife holders and having their cutting edges radially inwardly oriented, with said knife holders evenly distributed over a circumference of said knife ring;
a means for receiving said knife ring;
a support with a base body, said support being connected to said receiving means and insertable into an interior of said knife ring when said knife ring is received in said receiving means;
a transport mechanism connected to said support;
an adjusting device connected to said support;
an ejecting device connected to said receiving means and positioned at an outer circumference of said knife ring when said knife ring is received in said receiving means; and
a slidable exchange magazine slidably mounted on said receiving means and slidable in a direction transverse to an axial direction of said knife ring when said knife ring is received in said receiving means, wherein said flaking knives are sequentially exchanged such that, in a respective exchange position, said ejecting device ejects one of said flaking knives from said respective knife holder, said support positioned in said interior receives said flaking knife and exchanges same for a prepared sharpened flaking knife in said exchange magazine, said prepared sharpened flaking knife is inserted into said respective knife holder by said support, and said knife ring is then rotated into a further respective exchange position for exchanging a further one of said flaking knives.

3. An exchange device according to claim 2, wherein said transport mechanism is comprised of:
a glide plate having a lower edge and being connected to said base body of said support, said glide plate having a first inclination relative to the vertical and said flaking knives of said knife ring having a second inclination relative to an outer circumference of said knife ring, with said first and second inclination being identical, said glide plate further having a locking strip at said lower edge;
a transport frame of a rectangular shape and a size corresponding to the size of said flaking knives, said transport frame being open in a downward direction and slidable over said glide plate in said axial direction of said knife ring.

4. An exchange device according to claim 3, wherein said transport mechanism further comprises a gliding traverse, connected to said transport frame, and a sliding piece, said sliding piece being slidably connected to said gliding traverse, and a drive unit connected to said sliding piece for sliding said sliding piece back and forth on said gliding traverse, and wherein said glide plate further comprises a bottom portion and a locking plate with a bent portion, said locking plate being connected to said bottom portion and said bent portion forming said locking strip.

5. An exchange device according to claim 4, wherein said support has a compressed air jet connected to said sliding piece.

6. An exchange device according to claim 2, wherein said adjusting device is comprised of an adjusting cylinder having a piston rod arranged therein, said adjusting cylinder being connected to said base body, said adjusting device acting radially on the knife ring, and further comprising a transverse stay, connected to a free end of said piston rod, and a first and a second adjusting bracket connected to free ends of said transverse stay, each said bracket having two sensor surfaces spaced from one another in the circumferential direction of said knife ring and further having an adjusting surface located between said two sensor surfaces.

7. An exchange device according to claim 2, wherein said knife holder further comprises a knife support plate and a pressure screw, whereby said flaking knife is positioned on said knife support plate and is fastened by said pressure screws on said knife holder in a force-locking manner.

8. An exchange device according to claim 7, wherein said ejecting device is comprised of an ejecting cylinder having a piston rod arranged therein and an ejecting fork with two prongs connected to a free end of said piston rod, and wherein said knife holders each have two parallel grooves for guiding said prongs, each said knife holder further comprising a clamping strip and two leaf springs arranged between said clamping strip and said knife support plate, said clamping strip and said knife support plate being connected to one another by said pressure screw.

9. An exchange device according to claim 2, wherein said exchange magazine is divided into compartments that are open on two sides in a direction transverse to a longitudinal direction of said exchange magazine, said compartments having a first inclination relative to the vertical and said flaking knives of said knife ring having a second inclination relative to an outer circumference of said knife ring, with said first and second inclination being identical, and with a number of said compartments being greater by 1 than a number of said flaking knives.

10. An exchange device according to claim 9, wherein said exchange magazine further comprises a magazine slide, rails and a stepped switching device, said exchange magazine being fixedly connected to said magazine slide and said magazine slide being slidably connected to said rails, said stepped switching device being connected to said magazine slide.

11. An exchange device according to claim 2, wherein said receiving means comprises a frame, and further comprising a lifting cylinder with a limited stroke connected to said frame, said lifting cylinder having a piston rod with a pushing end arranged therein, and further comprising a spring connected between said frame and said lifting cylinder.

* * * * *